United States Patent [19]

Magerstädt et al.

[11] Patent Number: 5,250,215

[45] Date of Patent: Oct. 5, 1993

[54] FERROELECTRIC LIQUID-CRYSTAL MIXTURES CONTAINING MERCAPTO COMPOUNDS

[75] Inventors: Michael Magerstädt, Hofheim am Taunus; Norbert Rösch, Frankfurt am Main; Rainer Wingen, Hattersheim am Main, all of Fed. Rep. of Germany

[73] Assignee: Hoechst Aktiengesellschaft, Frankfurt am Main, Fed. Rep. of Germany

[21] Appl. No.: 741,136

[22] Filed: Aug. 7, 1991

[30] Foreign Application Priority Data

Aug. 9, 1990 [DE] Fed. Rep. of Germany ....... 4025236

[51] Int. Cl.$^5$ ...................... C09K 19/54; C09K 19/52
[52] U.S. Cl. .............. 252/299.5; 252/299.01; 359/75
[58] Field of Search ............ 252/299.01, 299.5, 299.6; 359/75, 104

[56] References Cited

U.S. PATENT DOCUMENTS

| | | | |
|---|---|---|---|
| 4,578,210 | 3/1986 | Praefcke et al. | 252/299.6 |
| 4,713,196 | 12/1987 | Praefcke et al. | 252/299.01 |
| 4,734,522 | 3/1988 | Praefcke et al. | 252/299.5 |
| 4,816,178 | 3/1989 | Katagiri et al. | 252/299.6 |
| 4,877,220 | 10/1989 | Praefcke et al. | 252/299.5 |

*Primary Examiner*—Philip Tucker
*Attorney, Agent, or Firm*—Curtis, Morris & Safford

[57] ABSTRACT

A liquid-crystalline mixture comprising at least two components, the first being an aromatic mercapto compound of the formula (I)

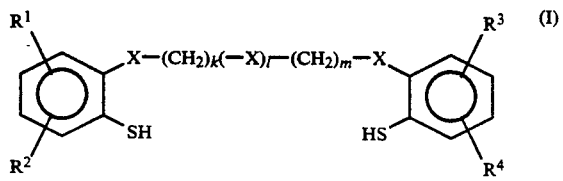

$R^1$, $R^2$, $R^3$ and $R^4$, independently of one another, are hydrogen, alkyl having 1 to 8 carbon atoms or alkoxy having 1 to 8 carbon atoms, —X— is —O—, —S— or —NH—, k and m, independently of one another, are 1, 2, or 3, and l is zero or 1, results in high contrasts in electrooptical switching and display devices.

10 Claims, 1 Drawing Sheet

SWITCHING BEHAVIOR OF FLC MIXTURE M 2

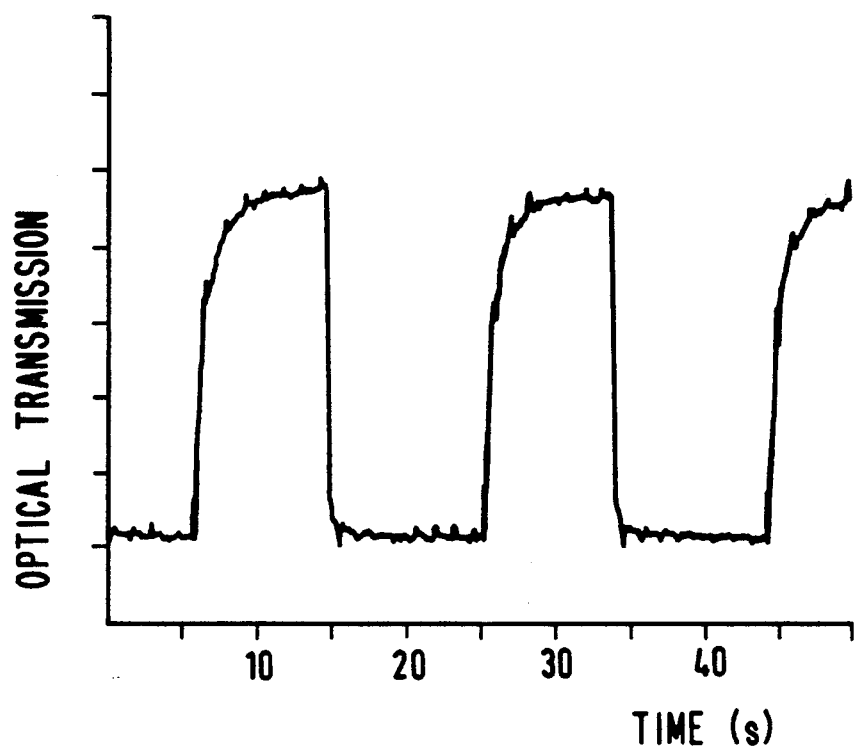
Fig. 1  SWITCHING BEHAVIOR OF FLC MIXTURE M 1
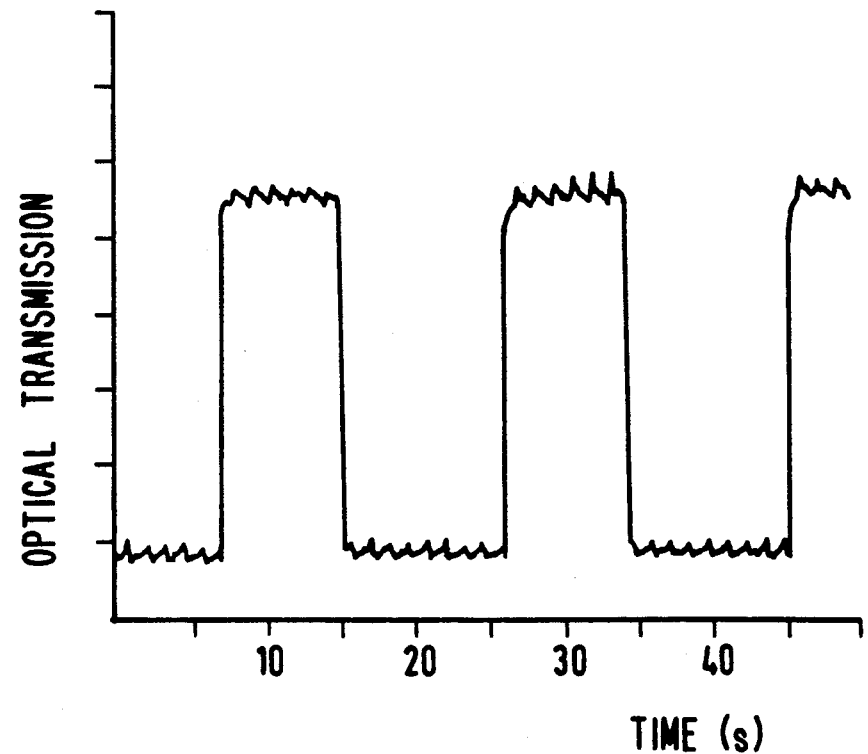
Fig. 2  SWITCHING BEHAVIOR OF FLC MIXTURE M 2

FERROELECTRIC LIQUID-CRYSTAL MIXTURES CONTAINING MERCAPTO COMPOUNDS

The invention relates to the use of mercapto compounds in ferroelectric liquid-crystal mixtures and to the use of these mixtures in electrooptical switching and display devices.

Switching and display devices containing ferroelectric liquid-crystal mixtures ("FLC light valves") are known, for example, from EP-B 0 032 362 (=US-A 4,367,924). Liquid-crystal light valves are devices which change their optical transmission properties, for example due to electrical switching, in such a manner that incident (and possibly reflected) light is modulated in intensity. Examples are the known watch and calculator displays or liquid-crystal displays in the TV sector. However, these also include light shutters, as employed, for example, in photocopiers or printers. Spatial light modulators are also included in the area of application of liquid-crystal light valves (see Liquid Crystal Device Handbook, Nikkan, Kogyo Shimbun, Tokyo, 1989; ISBN 4-526-02590-9C 3054, and the references cited therein).

Electrooptical switching and display devices generally contain the following components: a liquid-crystalline medium, electroinsulating layers, electrodes and outer plates (for example made of glass). In addition, they contain a polarizer if they are operated in guest-host or reflective mode or two polarizers if the mode utilized is transmissive birefringence.

If the selected separation between the outer plates is sufficiently small, alignment layers bring the FLC molecules of the FLC mixture into a configuration in which the longitudinal axes of the molecules are parallel to one another and in which the smectic planes are arranged perpendicular or at an angle to the alignment layer. In this arrangement, the molecules, as is known, have two equivalent alignments between which they can be switched by pulsed application of an electrical field, i.e. FLC displays can be subjected to bistable switching. The response times are inversely proportional to the spontaneous polarization of the FLC mixture and are in the range of $\mu$s.

The principal advantage of FLC displays of this type over the LC displays usually encountered hitherto in industrial practice is the multiplex ratio which can be achieved, i.e. the maximum number of lines which can be addressed in time-sequential mode ("multiplex mode"), which is significantly greater in FLC displays than in conventional LC displays. This electrical addressing is essentially based on the abovementioned pulse addressing described in illustrative terms in SID 85 DIGEST p. 131 (1985).

An essential disadvantage of FLC displays is that said pulse addressing frequently only results in reproducible switching between the two stable memory states if the spontaneous polarization is low. For example, it can be seen that an FLC display which has been in one of the two stable states for a relatively long time ("standing image") can only be switched into the other state with great difficulty, i.e. only at high amplitude, very long pulse duration or after repeatedly applied pulses. In image displays, this optical hysteresis behavior results in an image displayed for a relatively long period being visible in the subsequent image as a "ghost image" outline. This observation of optical hysteresis is the more pronounced the higher the spontaneous polarization of the FLC mixture and also depends on the type and thickness of the alignment layer.

Even at low polarization, this effect is noticeable and interfering. At particularly high values ($P_2 > 35$ nC·cm$^{-2}$), switching is generally no longer possible via pulse addressing. Since, as is known, very fast response times can only be achieved by high polarization, this prevents in particular the use of very fast FLC mixtures.

One of the hypotheses on the cause of this optical hysteresis phenomenon suggests that ionic impurities in the FLC mixture may be responsible (see, for example SID 88 DIGEST, p. 246, 1985). The suggested solutions hitherto of a) direct contact between the FLC mixture and the electrodes and b) complex cleaning have not yet led to any significant successes; the first method is very complex due to the need for particular measures to avoid electrical short-circuits, and the second requires a specific type of cleaning for each individual component of a mixture and complex and expensive handling of the FLC mixtures. A further solution has been suggested by M. Nitta et. al. (Japanese Journal of Applied Physics 27 (1988) L447), in which charge-transfer complexes (CTC) are employed to improve the optical switching behavior.

DE-A 39 39 697 has already suggested the use of complex ligands for ions in ferroelectric liquid-crystal mixtures. The complex ligands described were, in particular, mediocyclic and macrocyclic compounds. However, it is of great importance for the further development of FLC mixtures to have available a broad range of components in order to achieve good compatibility of the components and optimization of macroscopic parameters (such as contrast of the display).

The object of the present invention is to provide FLC mixtures which exhibit no or only negligible optical hysteresis and the associated ghost images, and which, in addition, ensure good compatibility of the individual mixture components both with one another and with other constituents of the display.

Surprisingly, it has been found that the above-described object can be achieved by adding specific aromatic mercapto compounds to liquid-crystal mixtures The liquid-crystalline mixture according to the invention comprises at least two components, the first component being an aromatic mercapto compound of the formula (I)

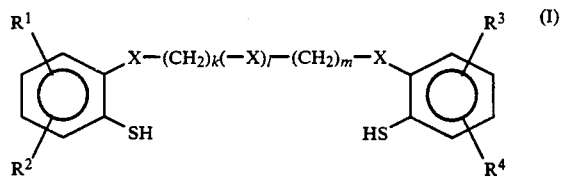

where
$R^1$, $R^2$, $R^3$ and $R^4$, independently of one another, are hydrogen, alkyl having 1 to 8 carbon atoms, or alkoxy having 1 to 8 carbon atoms,
—X— is —O—, —S— or —NH—,
k and m, independently of one another, are 1, 2 or 3, and
l is zero or 1.

Preference is given to a liquid-crystal mixture which contains a compound of the formula (I) where $R^1$, $R^2$, $R^3$ and $R^4$, independently of one another, are hydrogen, n-alkyl having 1 to 4 carbon atoms, tert.butyl, sec.butyl or isopropyl, —X— is —S—, k and m, are 2 or 3, and l is zero.

Particular preference is given to compounds of the formula (I) in which $R^1$, $R^2$, $R^3$ and $R^4$ are tert.butyl.

The mixtures according to the invention preferably have a smectic phase, in particular an S phase.

Particularly suitable components for the electrooptical switching and display devices described at the outset are mercapto compounds of the formula (I), the compounds preferably being used in the liquid-crystalline medium, but it also being possible in principle for them to be added, for example, to the material of the alignment layer.

The LC mixtures according to the invention preferably contain from 0.01 to 10 mol-%, in particular from 0.1 to 10 mol-%, of a compound of the formula (I). If a plurality of the compounds are present in the mixture, the total content is from 0.01 to 10 mol-%, preferably from 1 to 10 mol-%. The liquid-crystal mixtures generally comprise 2 to 20 components, preferably 2 to 15 components, including at least one of the compounds of the formula (I). The other constituents are preferably selected from known compounds having nematic, cholesteric and/or tilted/smectic phases, including, for example, Schiff's bases, biphenyls, terphenyls, phenylcyclohexanes, cyclohexylbiphenyls, pyrimidines, cinnamic acid esters, cholesterol esters and various bridged, polycyclic p-alkylbenzoic acid esters containing polar terminal groups. In general, the commercially available liquid-crystal mixtures, even before addition of the compound(s) according to the invention, are in the form of mixtures of various components, of which at least one is mesogenic, i.e. a compound which, in derivatized form or mixed with certain cocomponents, has a liquid-crystal phase [i.e. at least one enantiotropic (clearing point > melting point) or monotropic (clearing point < melting point) mesophase formation can be expected].

The use of mercapto compounds allows switching of even FLC mixtures with particularly high values for the spontaneous polarization ($P_s > 50$ nC·cm$^{-2}$) which cannot otherwise be switched in multiplex mode. A further advantage of the invention is the improvement in contrast, since optical hysteresis generally reduces the contrast.

An essential advantage is also that FLC displays, which frequently become inoperable after relatively long storage, remain switchable even after a relatively long time with the mixtures employed according to the invention. If ionic impurities are responsible for the formation of ghost images, they can also be buffered, so that impurities of an ionic type introduced subsequently and formed, for example, by diffusion from the alignment layer do not have any adverse consequences.

The liquid-crystal mixtures described can advantageously be employed, as stated above, in electrooptical switching and display devices (FLC light valves or displays). These have, inter alia, the following constituents: a liquid-crystalline mixture (containing an aromatic mercapto compound), outer plates (for example made of glass or plastic), coated with transparent electrodes (two electrodes), at least one alignment layer, spacers, a bonding frame, polarizers, and, for color displays, thin colored filter layers. Other possible components are antireflection, passivation, compensation and barrier coatings and electrically nonlinear elements, such as, for example, thin-film transistors (TFT) and metal-insulator-metal (MIM) elements. The general construction of liquid-crystal displays has already been described in detail in relevant monographs (for example E. Kaneko, "Liquid Crystal Displays", KTK Scientific Publishers, 1987, pages 12–30 and 163–172).

Amongst the FLC light valves, switching devices which can be addressed in multiplex mode are preferred. Particular preference is given to liquid-crystal cells which operate by means of SSFLC technology ("surface stabilized ferroelectric liquid crystal") and in which the layer thickness (i.e. the distance between the outer plates) is from 1 to 20 μm. A layer thickness of from 1 to 10 μm is particularly preferred, in particular from 1.2 to 3 μm in birefringence mode.

In addition, the compounds according to the invention can advantageously be employed in guest-host mode on operation of an SSFLC display; here, the optical effect is not based on birefringence phenomena, but instead on anisotropic absorption of dichroic dyes dissolved in an FLC matrix.

The compounds of the formula (I) are prepared, for example, from ortho-substituted benzenethiols of the formula (II) or (III) and α,ω-disubstituted compounds of the formula (IV) in the presence of a heavy metal (template reaction) with subsequent liberation of (I) from the primary complex, as described, for example, in J. Organomet. Chem. 247 (1983) 307; J. Organomet. Chem. 258 (1983) 315; J. Organomet. Chem. 297 (1985) 319; J. Organomet. Chem. 314 (1986) 91,

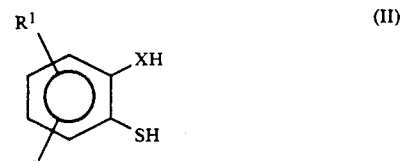

(II)

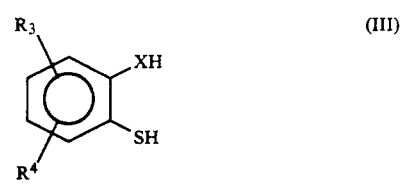

(III)

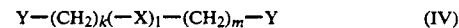

Y—(CH$_2$)$_k$(—X)$_l$—(CH$_2$)$_m$—Y  (IV)

where $R^1$, $R^2$, $R^3$, $R^4$, X, k, l and m are as defined above, and Y is a good leaving group, such as, for example, —Br, —Cl, toluenesulfonate or similar sulfonic acid esters.

EXAMPLE

In the example below, a mercapto compound accessible by methods known from the literature is employed in a concentration of 1 mol-% in a base mixture. An example of a component according to the invention is the compound (A), 1,2-bis[(2-mercapto-3,5-tert-butyl)-phenylthio]ethane

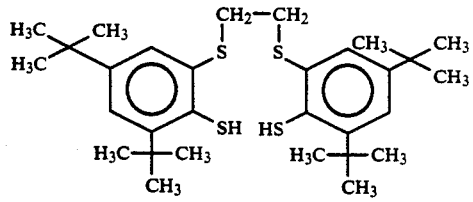
(A)

An FLC mixture (M1) is prepared from the following 11 components (in mol-%)

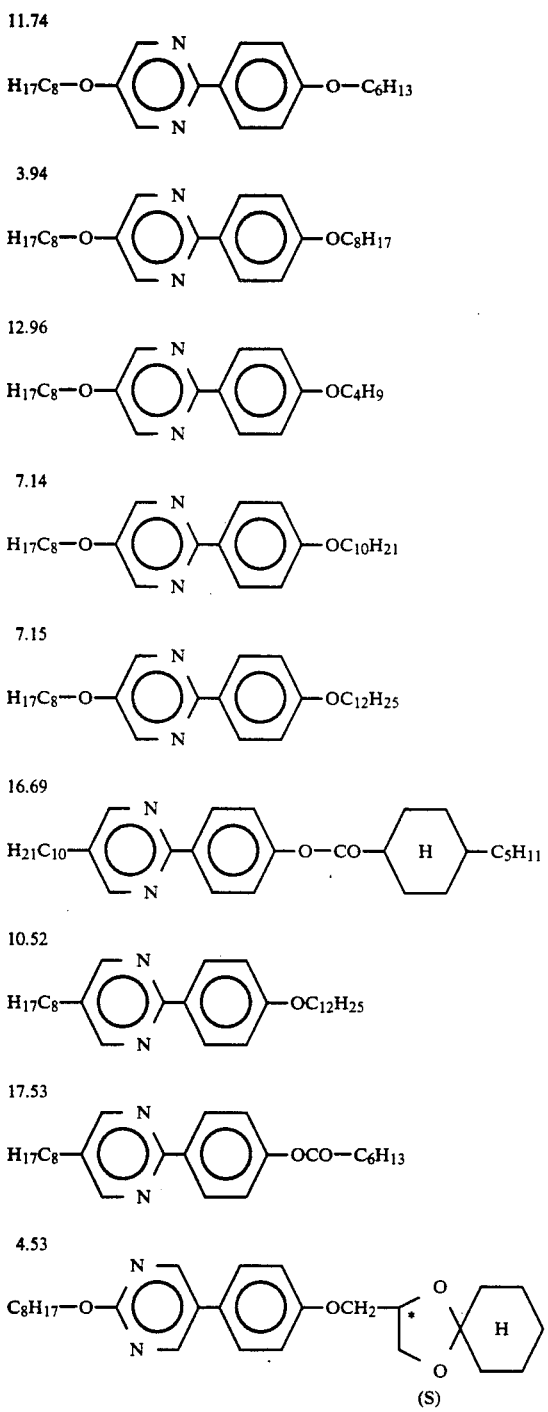

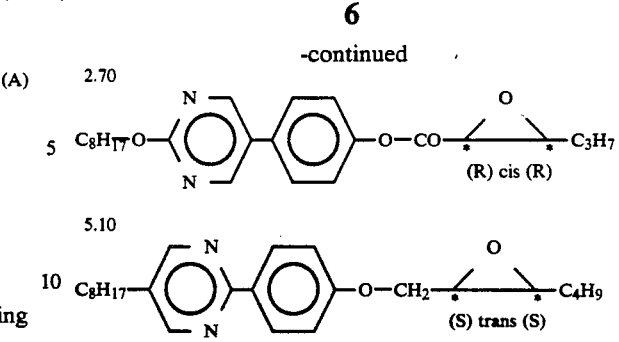

This mixture (M1) has the phase sequence: $S_C^*$ 61 $S_A^*$ 69 $N^*$ 85 I and a spontaneous polarization of 30 $nC \cdot cm^{-2}$.

The mercapto compound (A) (1mol-%) according to the invention is added to this FLC mixture. The resultant FLC mixture (M2) and the FLC mixture without the mercapto compound (M1) are introduced into two identical, commercially available FLC cells provided with electrodes (manufacturer E. H. C., Tokyo, Japan) with alignment layers on both sides comprising rubbed polyimide.

The cells are subjected at room temperature to bipolar electrical pulses of the same polarity sequence at a pulse separation of 50 ms. The polarity sequence changes after 10 seconds. In order to record the optical switching response, the cell is introduced into the ray path of a polarizing microscope, and the transmission is followed using a rapid photodiode.

BRIEF DESCRIPTION OF THE DRAWINGS

FIG. 1 and FIG. 2 show the switching behavior of the two FLC cells.

The advantage of the FLC mixture according to the invention (M 2, see FIG. 2) is apparent from the fact that switching from bright to dark (optical transmission) and vice versa takes place very rapidly and without the interfering appearance of ghost effects. In the comparison mixture (M 1, see FIG. 1), these interfering effects are clearly apparent during the switching operation.

We claim:

1. A liquid-crystalline mixture comprising at least two components, wherein the first component is an aromatic mercapto compound of the formula (I)

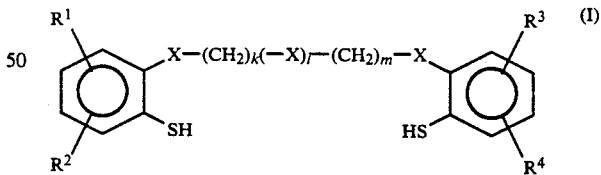

where

R¹, R², R³ and R⁴, independently of one another, are hydrogen, alkyl having 1 to 8 carbon atoms or alkoxy having 1 to 8 carbon atoms, —X— is —O—, —S— or —NH—, k and m, independently of one another, are 1, 2 or 3, and l is zero or 1.

2. A mixture as claimed in claim 1, containing a compound of the formula (I) where R¹, R², R³ and R⁴, independently of one another, are hydrogen, n-alkyl having 1 to 4 carbon atoms, tert-.butyl, sec.butyl or isopropyl, —X— is —S—, k and m are 2 or 3, and
l is zero.

3. A mixture as claimed in claim 2, containing a compound of the formula (I) where $R^1$, $R^2$, $R^3$ and $R^4$ are tert.butyl.

4. A mixture as claimed in claim 1, having a smectic phase.

5. A mixture as claimed in claim 1, which is ferroelectric.

6. A liquid-crystal mixture as claimed in claim 1, wherein the mixture contains from 0.01 to 10 mol-% of a compound of the formula (I).

7. A liquid-crystal switching and display device containing a liquid-crystalline medium, outer plates, electrodes, and at least one alignment layer, wherein the liquid-crystalline medium is a liquid-crystal mixture which contains at least one compound of the formula (I) as claimed in claim 1.

8. A liquid-crystal switching and display device as claimed in claim 7, which is an SSFCL cell having a layer thickness of from 1 to 20 μm, and wherein the liquid-crystal mixture is ferroelectric.

9. A liquid-crystal switching and display device as claimed in claim 8, wherein the SSFCL cell has a layer thickness of from 1 to 10 μm.

10. A liquid-crystal switching and display device as claimed in claim 7, further comprising additional auxiliary layers.

* * * * *